United States Patent
Gao

(10) Patent No.: US 6,650,818 B2
(45) Date of Patent: Nov. 18, 2003

(54) RARE EARTH DOPED OPTICAL WAVEGUIDE AND LASER WITH OPTIMAL BENDING CURVES

(75) Inventor: Renyuan Gao, Strafford, PA (US)

(73) Assignee: Photon-X, Inc., Malvern, PA (US)

(*) Notice: Subject to any disclaimer, the term of this patent is extended or adjusted under 35 U.S.C. 154(b) by 4 days.

(21) Appl. No.: 09/877,871

(22) Filed: Jun. 8, 2001

(65) Prior Publication Data

US 2002/0191935 A1 Dec. 19, 2002

(51) Int. Cl.⁷ .............................. G02B 6/10; H04B 10/12
(52) U.S. Cl. ..................................... 385/132; 359/341.3
(58) Field of Search .......................... 385/146, 122–132; 372/6, 92–94; 359/134, 341.3, 341.5, 346, 351

(56) References Cited

U.S. PATENT DOCUMENTS

| | | |
|---|---|---|
| 5,039,190 A | 8/1991 | Blonder et al. |
| 5,119,460 A | 6/1992 | Bruce et al. |
| 5,726,796 A | 3/1998 | Regener et al. |
| 5,778,132 A | 7/1998 | Csipkes et al. |
| 5,923,694 A * | 7/1999 | Culver ........................ 372/6 |
| 6,043,929 A | 3/2000 | Delavaux |

FOREIGN PATENT DOCUMENTS

WO    WO 00/05788 A1    2/2000

OTHER PUBLICATIONS

Suzuki, S., Shuto, K., Takahashi, H. and Hibino, Y. "Large–Scale and High–Density Planar Lightwave Circuits with High–Delta GeO2–Doped Silica Waveguides" Electronics Letters, Sep. 24, 1992, vol. 28 No. 20, pp. 1863–1864.*

Abell & Braselton Modern Differential Equations: Theory, Applications, Technology, Saunders Colllege Publishing, New York, 1996, pp. 454–456, 465–466, 487–488, 513–514, 555–558 and 495–500.*

Excerpt from Merriam–Webster's Collegiate Dictionary, 10$^{th}$ Edition, Springfield, MA, 1998. p. 655.*

The Photonics Directory, Photonics Dictionary–Definition for the word "fiber laser".*

(List continued on next page.)

Primary Examiner—David V. Bruce
Assistant Examiner—Krystyna Suchecki
(74) Attorney, Agent, or Firm—Joseph E. Maenner; Monte & McGraw, P.C.

(57) ABSTRACT

A channel waveguide optical amplifier is disclosed. The amplifier includes a substrate and an optical waveguide channel disposed on the substrate. The optical waveguide channel includes a first generally spiraling portion having a first free end and a first connected end, a second generally spiraling portion having a second free end and a second connected end, and a transition portion. The transition portion has a first transition section connected to the first connected end, a second transition section connected to the second connected end, and an inflection between the first and second transition sections. An amplifier assembly incorporating the channel waveguide and a method of amplifying a light signal are also disclosed.

31 Claims, 8 Drawing Sheets

OTHER PUBLICATIONS

The Photonics Directory, Photonics Dictionary–Definition for the word "lasing medium".*

The Photonics Directory, Photonics Dictionary–Definition for the word "stimulated emission".*

The Photonics Directory, Photonics Dictionary–Definition for the word "erbium–doped fiber amplifier (EDFA)".*

The Photonics Directory, Photonics Dictionary–Definition for the word "gain".*

The Photonics Directory, Photonics Dictionary–Definition for the word "amplifier".*

Becker et al., Advanced Ti:Er:LiNbO$_3$ Waveguide Lasers, IEEE Journal of Selected Topics in Quantum Electronics, vol. 6, No. 1, Jan./Feb. 2000, pp 101–113.

Jaouen et al., Eight–Wavelength Er–Yb Doped Amplifier: Combiner/Splitter Planar Integrated Module, IEEE Photonics Technology Letters, vol. II, No. 9, Sep. 1999, pp 1105–1107.

Ghosh et al., 8–mW Threshold Er$^{3+}$–Doped Planar Waveguide Amplifier, IEEE Photonics Technology Letters, vol. 8, No. 4, Apr. 1996, pp 518–520.

Ohashi et al., Bending Loss Effect on Signal Gain in an Er$^{3+}$–Doped Fiber Amplifier, IEEE Photonics Technology Letters, vol. 4, No. 2, Feb. 1992, pp 192–194.

Kitagawa et al., "Amplification in Erbium–Doped Silica––Based Planar Lightwave Circuits", Electronics Letters, vol. 28, No. 19, Sep. 10, 1992.

Huang et al., "Analysis of Folded Erbium–Doped Planar Waveguide Amplifiers by the Method of Lines", Journal of Lightwave Technology, vol. 17, No. 12, Dec. 1999, pp. 2658–2664.

* cited by examiner

RARE EARTH DOPED OPTICAL WAVEGUIDE AND LASER WITH OPTIMAL BENDING CURVES

STATEMENT REGARDING FEDERALLY FUNDED SPONSORED RESEARCH OR DEVELOPMENT

The U.S. Government has a paid-up license in this invention and the right in limited circumstances to require the patent owner to license others on reasonable terms as provided for by the terms of Contract No. N00014-00-C-0117 awarded by the Department of the Navy.

FIELD OF THE INVENTION

The present invention relates to integrated optical amplification devices, specifically, optical waveguides and lasers.

BACKGROUND OF THE INVENTION

Optical communication systems based on glass optical fibers (GOF) allow communication signals to be transmitted not only over long distances with low attenuation, but also at extremely high data rates, or bandwidth capacity. This capability arises from the propagation of a single optical signal mode in the low-loss windows of glass located at the near-infrared wavelengths of 850, 1310, and 1550 nm. Since the introduction of erbium-doped fiber amplifiers (EDFAs), the last decade has witnessed the emergence of single-mode GOF as the standard data transmission medium for wide area networks (WANs), especially in terrestrial and transoceanic communication backbones. In addition, the bandwidth performance of single-mode GOF has been vastly enhanced by the development of dense wavelength division multiplexing (DWDM), which can couple up to 80 channels of different wavelengths of light into a single fiber, with each channel carrying up to 10 gigabits of data per second. Moreover, recently, a signal transmission of greater than 1 terabit ($10^{12}$ bits) per second has been achieved over a single fiber on a 60-channel DWDM system. Bandwidth capacities are increasing at rates of as much as an order of magnitude per year.

The success of the single-mode GOF in long-haul communication backbones has given rise to the new technology of optical networking. The universal objective is to integrate voice video, and data streams over all-optical systems as communication signals make their way from WANs down to smaller local area networks (LANs) of Metro and Access networks, down to the curb (FTTC), home (FTTH), and finally arriving to the end user by fiber to the desktop (FTTD). Examples are the recent explosion of the Internet and use of the World Wide Web, which are demanding vastly higher bandwidth performance in short- and medium-distance applications. Yet, as the optical network nears the end user starting at the LAN stage, the network is characterized by numerous splittings of the input signal into many channels. This feature represents a fundamental problem for optical networks. Each time the input signal is split, the signal strength per channel is naturally reduced.

Rare earth doped optical amplifiers are emerging as the predominant optical signal amplification device for every aspect of optical communication networks spanning from repeaters, pre-amplifiers, and power boosters to in-line amplifiers for wavelength division multiplexed (WDM) systems. These amplifiers are suitable for long-haul, submarine, metro, community antenna television (CATV) and local area networks. An optical amplifier amplifies an optical signal directly in the optical domain without converting the signal into an electrical signal and reconverting the electrical signal back to an optical signal. As optical telecommunication networks push further and further toward the end user, as represented by the technology of FTTC, FTTH, and FTTD, there is an ever growing demand for compact and low cost optical amplification devices.

The key to an optical signal amplifier device is the gain medium. Gain media are typically made by doping rare earth ions into the core of an optical fiber. However, rare earth doped optical fiber has the disadvantage of high-cost, long length and difficulty of integration with other optical components, such as optical couplers, splitters, detectors, and diode lasers, resulting in high cost of manufacturing and bulkiness of the devices. As a cost-effective alternative to doped fibers, doped waveguides can be used as an amplification medium. Waveguides provide a benefit over fibers of being able to amplify a light signal over a significantly smaller area than fiber.

FIG. 1 shows a typical structure of a prior art integrated waveguide optical amplifier 20. The optical gain medium is formed by various processes (e.g. modified chemical vapor deposition, ion exchange, photolithography, flame-hydrolysis, reactive ion-etching, etc.) and the resulting gain medium is a straight line rare earth (RE) doped waveguide 22. The RE doped waveguide 22 is pumped by a pump laser 24, which generates a pump signal $\lambda_p$. Preferably, the pump laser 24 operates at approximately 980 nm, 1060 nm, or 1480 nm, although those skilled in the art will recognize that the pump laser 24 can operate at other wavelengths as well. The pump signal $\lambda_p$ is combined with the optical signal $\lambda_s$ to be amplified (e.g.1530 nm −1610 nm for an erbium doped channel waveguide) by a directional coupler 26. Optical isolators 28 are inserted into the optical path to prevent back-reflected signal amplification in the RE doped channel waveguide 22. The waveguide amplifier 20 may be used either as a signal amplifier as illustrated in FIG. 1 or as a laser 30 as illustrated in FIG. 2. In the latter case, reflection devices such as mirrors or fiber and waveguide gratings 32 are included in the optical path to create a laser oscillation cavity.

In order to achieve a desired 10 dB–30 dB signal gain in the amplifier 20, or to achieve laser output in the waveguide laser 30, a relatively high concentration of the rare earth ions are required, since the waveguide substrate (e.g. a four inch silicon wafer) can only accommodate a straight line waveguide with a length that is no longer than the waveguide substrate diameter. High concentration of rare earth ions can lead to problems such as ion clustering and lifetime quenching, which in turn reduce the amplifier performance. Furthermore, the straight line amplification waveguide can be required to be more than 10 cm long, which requires the dimension of the amplifier device to be greater than 10 cm in length, thus making it impractical to build the amplifier device more compact. Prior art as exemplified in U.S. Pat. No. 5,039,191 (Blonder et al.), U.S. Pat. No. 6,043,929 (Delavaux et al.), U.S. Pat. No. 5,119,460 (Bruce et al.), PCT Publication WO 00/05788 (Lawrence et al.), and J. Schmulovish, A. Wong, Y. H. Wong, P. C. Becker, A. J. Bruce, R. Adar "$Er^{3+}$ Glass Waveguide Amplifier at 1.55 μm on Silicon," Electron. Lett., Vol. 28, pp. 1181–1182, 1992 all disclose such straight line waveguides.

It would be beneficial to have a curved channel waveguide that is contained on a relatively small area on a substrate, hence increasing the amplification channel waveguide length and reducing the overall size of the amplifier. Bruce et al. as well as M. Ohashi and K. Shiraki, "Bending Loss Effect on Signal Gain in an Er$^{3+}$ Doped Fiber Amplifier," IEEE Photon. Technol. Lett., Vol. 4., pp. 192–194, 1992 disclose a curved zig-zag shaped channel waveguide 40 to increase the channel length, as shown in FIG. 3. However, this approach creates the problem of high bending losses at turning regions 42 in the curved waveguide 40. The bending radius is $R_{bending}=(\frac{1}{2}n) R_{substrate}$ where n is the number of channel waveguide curve turning regions 42. Due to the high bending curvature, or small bending radius, the bending loss of such waveguide 40 is extremely high, resulting in low signal gain and limited usable waveguide channel length. Another approach is to use a spiral type waveguide with a plurality of 90° bends to reduce the amount of area required for the waveguide, as is shown in FIG. 4. However, because of the tight bend radius at each of the 90° bends, a substantial amount of light is lost at each bend.

Due to the disadvantages of the prior art described above, an optimized bending shape is desired to achieve more compact and integrated amplifier devices at lower manufacturing cost and without the losses exhibited by current curved waveguides.

BRIEF SUMMARY OF THE INVENTION

Briefly, the present invention provides a channel optical waveguide. The channel optical waveguide comprises a substrate and an optical waveguide channel disposed on the substrate. The optical waveguide channel includes a first generally circular spiraling portion having a first free end and a first connected end, a second generally circular spiraling portion having a second free end and a second connected end, and a transition portion. The transition portion includes a first transition section connected to the first connected end, a second transition section connected to the second connected end, and an inflection between the first and second transition sections.

The present invention also provides a channel waveguide optical amplifier assembly. The assembly comprises a waveguide optical amplifier including a substrate, a first cladding layer disposed on the substrate and a second cladding layer disposed within the first cladding layer. The second cladding layer is generally annular and includes a generally tangential portion. The amplifier also includes an optical waveguide channel disposed within the second cladding layer. The optical waveguide channel includes a first generally circular spiraling portion having a first free end and a first connected end, a second generally circular spiraling portion having a second free end and a second connected end, and a transition portion having a first transition section connected to the first connected end, a second transition section connected to the second connected end, and an inflection between the first and second transition sections. The assembly also includes a pump laser disposed proximate the generally tangential portion and targeted to direct pump laser light to the second cladding layer through the generally tangential portion.

Additionally, the present invention also includes a method of amplifying light in an optical waveguide. The method comprises providing a channel optical waveguide, the waveguide including a substrate, a first cladding layer disposed on the substrate, a second cladding layer disposed within the first cladding layer, such that the second cladding layer includes a generally tangential portion, and a rare earth element containing optical waveguide channel disposed within the second cladding layer. The optical waveguide channel includes a first generally circular spiraling portion having a first free end and a first connected end, a second generally circular spiraling portion having a second free end and a second connected end, and a transition portion having a first transition section connected to the first connected end, a second transition section connected to the second connected end, and an inflection between the first and second transition sections. The method further comprises providing a pump laser disposed proximate the generally tangential portion and targeted to direct pump laser light to the second cladding layer through the generally tangential portion; transmitting signal light into the first free end of the first generally spiraling portion of the optical waveguide channel; and transmitting pump light into the second cladding layer through the generally tangential portion, the pump light exciting the rare earth element and amplifying the signal light.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
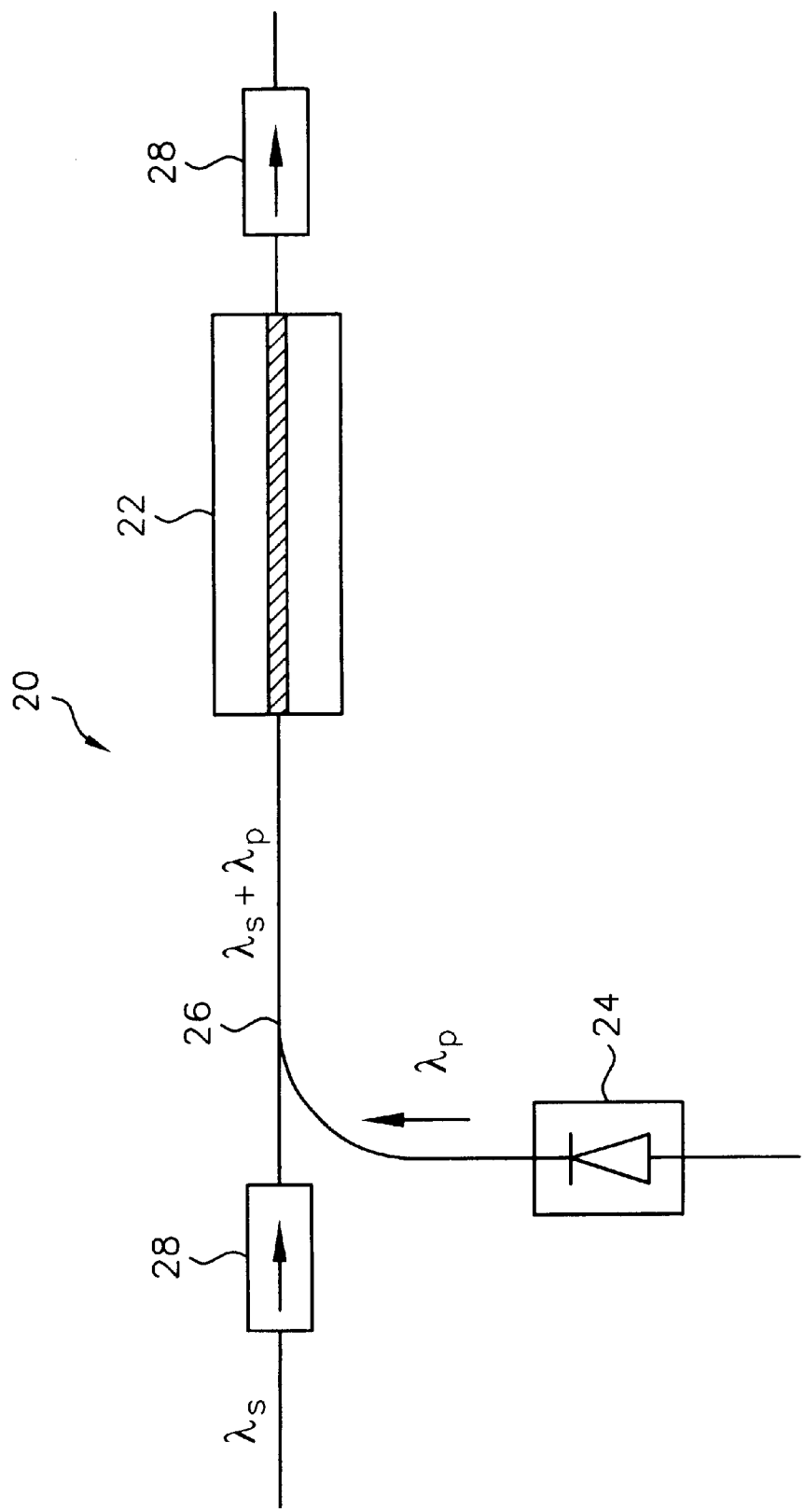
FIG. 1 is a schematic of a prior art amplifier device.

In the drawings, like numerals indicate like elements throughout. Reference is made to U.S. patent application Ser. Nos. 09/507,582, filed Feb. 18, 2000; 09/722,821, filed Nov. 28, 2000; 09/722,822, filed Nov. 28, 2000; and 60/253,225, filed Nov. 27, 2000, which are all incorporated by reference herein in their entireties.

Figure 5:
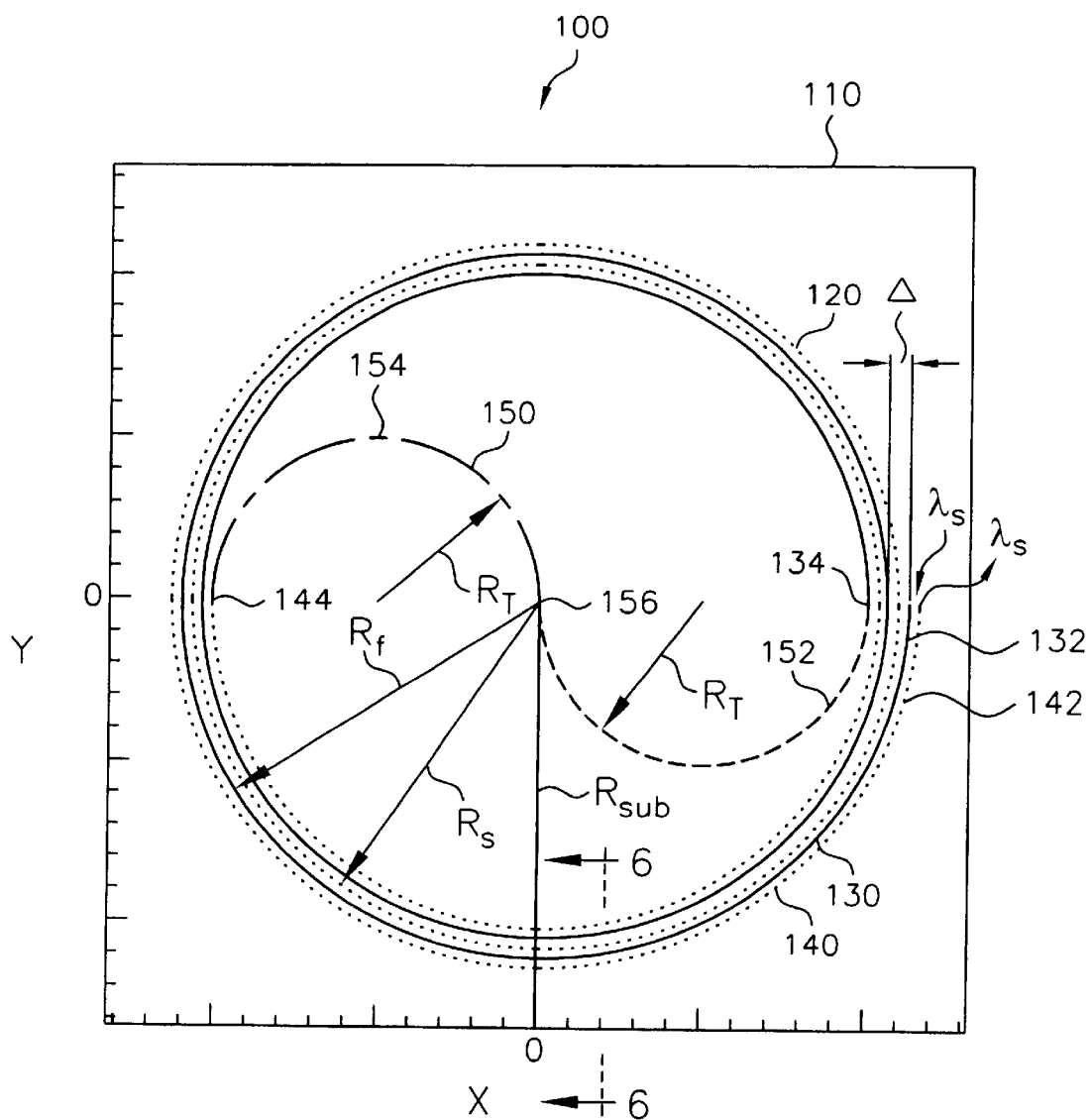
FIG. 5 is a top plan view of a waveguide according to a preferred embodiment of the present invention.

FIG. 5 is a top plan view of the basic structure of a preferred embodiment of a channel waveguide amplifier 100 in accordance with the present invention. The waveguide amplifier 100 uses a generally circular double spiral structure that maximizes the usage of the area of a substrate 110 and maximizes the bending radius of a waveguide 120 disposed on the substrate 110. On a substrate of a defined size, the usable length of the optimized curved amplifier waveguide 120 is not limited by the substrate length or diameter. The bending radius on the waveguide amplifier 100 is about half of the radius $R_{sub}$ of the substrate 110 in the center part of the waveguide 120 and is approximately equal to the radius $R_{sub}$ of the substrate 110 in the outer part of the waveguide 120. The width of each channel 122 (preferably approximately 5 micrometers) of the waveguide 120 is much smaller than the diameter or the width of the substrate 110 (e.g. about 10–15 centimeters), and the separation between channels 122 of the waveguide 120 is also much smaller than the diameter or the width of the substrate 110. As a result, the separation between adjacent channels 122 of the waveguide 120 can be as small as approximately 100 micrometers. Although only five winding channels 122 are shown in FIG. 5, the number of winding channels 122 can be on the order of hundreds, greatly increasing the amplification channel length, and at the same time maintaining the relatively large bending radius necessary for desired small bending losses.

The substrate 110 is preferably constructed from optical materials, such as silicon, various glasses (e.g. silicate and phosphate glasses), polymers, crystals (e.g. titanium diffused lithium niobate, or Ti:LiNbO$_3$) as well as other optical materials, as will be recognized by those skilled in the art. There are various known ways of forming channel waveguides, including RE doped waveguides, on optical substrate materials. These methods include, but are not limited to: vapor deposition, ion exchange, photolithography, flame hydrolysis, reactive ion etching, etc. These techniques are well known to those skilled in the art, and will not be further discussed herein. It is to be understood that the herein disclosed structural layout can be implemented on any waveguide materials with any waveguide fabrication methods.

Figure 6:
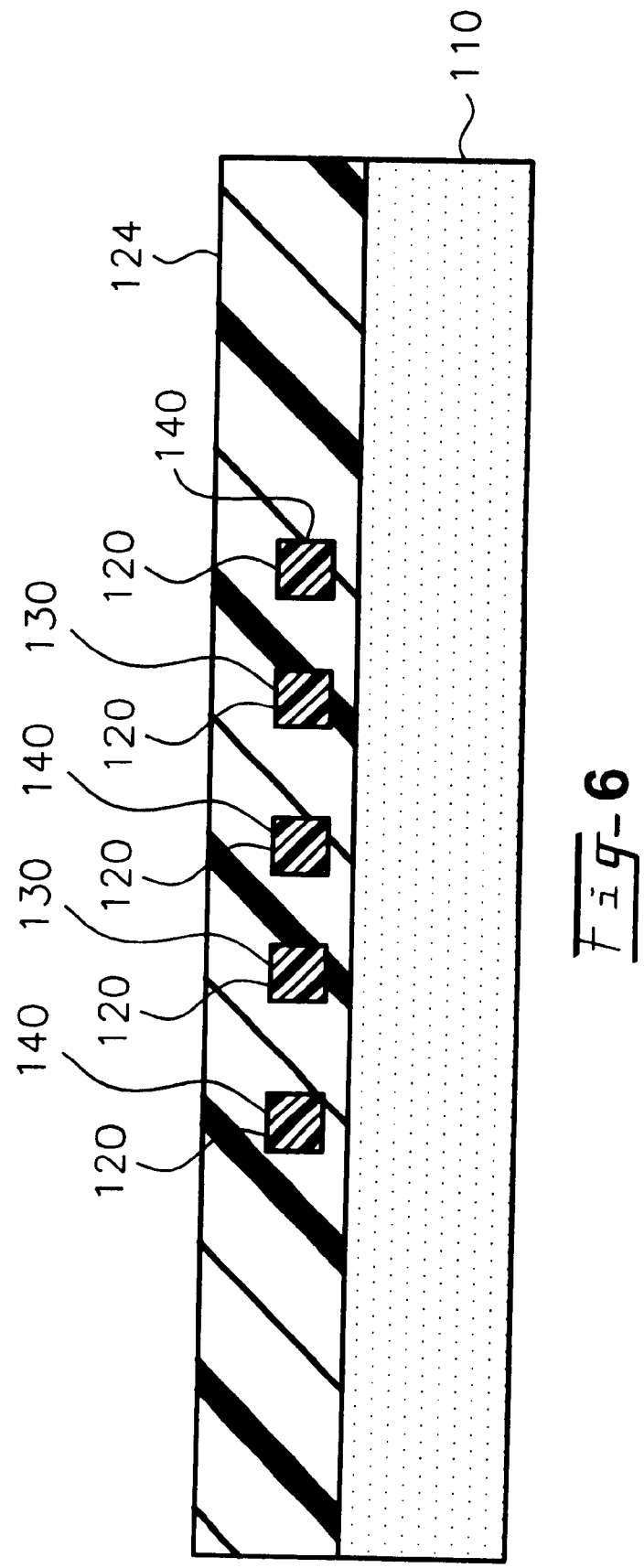
FIG. 6 is a partial side view, in section, of the waveguide of FIG. 5 taken along lines 6—6 of FIG. 5.

FIG. 6 is a cross-sectional view of the first embodiment, which shows that the waveguide amplifier 100 contains the RE doped waveguide 120 embedded within a cladding region 124, with the cladding region 124 being disposed directly on the optical substrate 110. Preferably, the cross-sectional dimensions of the cladding region 124 are between approximately 1 and 2 millimeters wide and between approximately 5 and 50 micrometers high, although those skilled in the art will recognize that the cladding region 124 can have other cross-sectional dimensions as well. Although the cross-sectional size of the waveguide channel 122 is preferably approximately 5 micrometers, the cross-sectional size of the waveguide channel 122 can be between approximately 1 to 15 micrometers, depending in the refractive index difference between the material comprising the waveguide 120 and the cladding 124. For a relatively small refractive index difference (approximately 0.2%), the cross-sectional size is preferably closer to 15 micrometers, and for a relatively large refractive index difference (approximately 5%), the cross-sectional size is preferably closer to 1 micrometer.

As illustrated in FIG. 6, the cross-sectional shape of the channel 122 is preferably square, for ease of fabrication and splicing with optical fibers, as well as reduced polarization effects, but the channel 122 can be other shapes, such as rectangular or circular. The winding of the channels 122 follows a generally circular spiral curve as shown in FIG. 5 to minimize light losses and optimize signal transmission through the waveguide 120.

Figure 4:
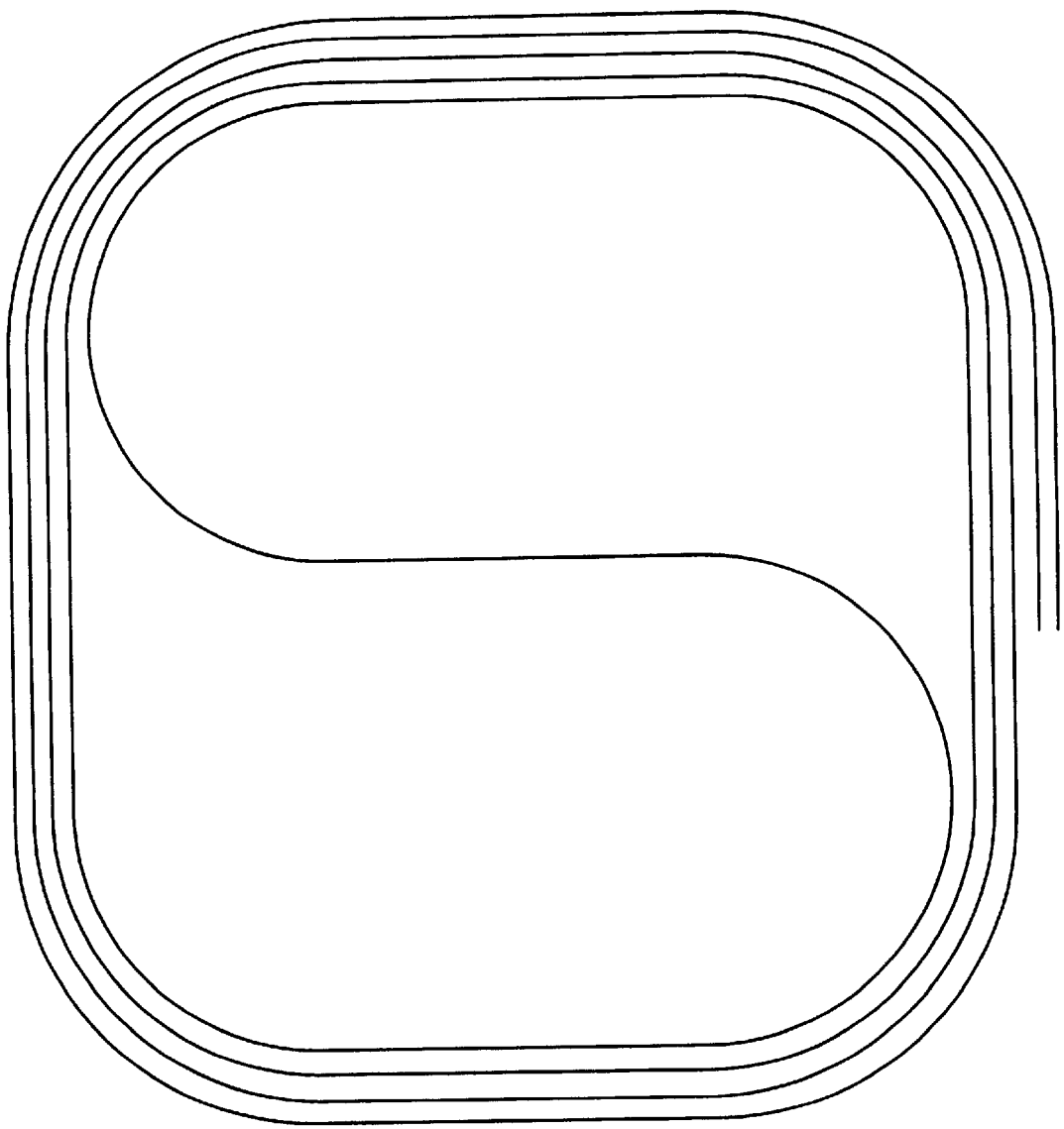
FIG. 4 is a top plan view of a second prior art waveguide.

It can be shown that, for a prior art generally square waveguide, such as the waveguide shown in FIG. 4, with 90° bends having an approximate radius of 10 millimeters, the waveguide bends the 90° over a distance of 5π millimeters, while a generally circular waveguide 120, shown in FIG. 5, having an approximate radius $R_F$, $R_s$ of 25 millimeters bends only 36° over a distance of 5π millimeters. The reduced bending the waveguide 120 retains more light within the waveguide 120 than the prior art waveguide, the amount of which depends on several factors, including the numerical aperture of the waveguide and the number of turns on the waveguide 120.

Preferably, the waveguide 120 is constructed from either an optical glass or an optical polymer, such as the phosphate glass disclosed in co-pending U.S. Patent Application Serial No. 60/253,225, filed Nov. 27, 2000, or a polymer disclosed in any of co-pending U.S. patent application Ser. Nos. 09/507,582, filed Feb. 18, 2000; 09/722,821, filed Nov. 28, 2000; or 09/722,822, filed Nov. 28, 2000. The rare earth element in the waveguide 120 preferably consists of one of the group of lanthanum, cerium, praseodymium, neodymium, promethium, samarium, europium, gadolinium, terbium, dysprosium, holmium, erbium, thulium, ytterbium, and lutetium. However, those skilled in the art will recognize that other elements, as well as combinations of elements, can be used. For example, a co-dopant rare earth polymer with two of the above-mentioned rare earths or one of the above-mentioned rare earths and aluminum can be used.

Referring to FIG. 5, the waveguide 120 comprises a first generally circular spiraling portion 130, a second generally circular spiraling portion 140, and a transition portion 150. The first generally circular spiraling portion 130, represented by the solid line, has a first free end 132 and a first connected end 134. Although the first spiraling portion 130 has a constantly decreasing first radius $R_f$ from the first free end 132 to the second free end 134, the first radius $R_f$ decreases so insignificantly that the first radius $R_f$ can be treated as being approximately a constant first radius $R_f$. The second generally circular spiraling portion 140, represented by the dotted line, has a second free end 142 and a second connected end 144. Although the second spiraling portion 140 has a constantly decreasing second radius $R_s$ from the first free end 142 to the second connected end 144, the second radius $R_s$ decreases so insignificantly that the second radius $R_s$ can also be treated as being approximately a constant second radius $R_s$, which is approximately equal to the approximate first radius $R_f$. Additionally, the first and second radii $R_f$, $R_s$, respectively, can be approximately equal to, but slightly less than, the substrate radius $R_{sub}$. The first and second generally circular spiraling portions 130, 140 are generally intertwined with each other such that, as shown in FIG. 6, the first and second generally circular spiraling portions 130, 140 alternate with each other as viewed from left to right.

The transition portion 150 has a first transition section 152, represented by the dashed line, which is curved in a first direction and is connected to the first connected end 134. The transition portion 150 also includes a second transition section 154, represented by the broken line, which is curved in a second direction and is connected to the second connected end 144. An inflection 156 is located between and connects the first transition section 152 and the second transition section 154. The inflection 156 reverses the curvature of the transition portion 150. As shown in FIG. 5, the inflection 156 is located generally in the geometric center of the waveguide amplifier 100. Such location of the inflection 156 maximizes use of space on the substrate 110 and maximizes the radii $R_f$, $R_s$. The first transition section 152 and the second transition section 154 each have an approximate transition radius $R_f$ approximately one half of the approximate first radius $R_f$.

Preferably, the shape of the waveguide 120, from the input 132 to the output 142, can be represented by the following set of equations:

First generally circularly spiraling portion 130:

$$X=(R+\Delta\cdot\theta/2\pi)\cdot\cos\theta;\ Y=(R+\Delta\cdot\theta/2\pi)\cdot\sin\theta,\ \theta=[2n\pi,\ 0] \quad \text{Equation 1}$$

First transition section 152:

$$X=(R/2)+(R/2)\cdot\cos\theta;\ Y=(R/2)\cdot\sin\theta,\ \theta=[0,-\pi] \quad \text{Equation 2}$$

Second transition section 154:

$$X=(R/2)-(R/2)\cdot\cos\theta;\ Y=(R/2)\cdot\sin\theta,\ \theta=[0,\pi]$$ Equation 3

Second generally circularly spiraling portion 140:

$$X=(R+\Delta\cdot\theta/2\pi+\Delta/2)\cdot\cos\theta; Y=(R+\Delta\cdot\theta/2\pi+\Delta/2)\cdot\sin\theta,$$
$$\theta=[-\pi,\ 2n\pi]$$ Equation 4 where n is the number of turns on each of the first and second generally circularly spiraling portions 130, 140; R is the smallest radius of the first generally circularly spiraling portion 130; X is the X coordinate of each point on each portion 134, 140 and each section 152, 154; Y is the Y coordinate of each point on each portion 134, 140 and each section 152, 154; Δ is the separation of adjacent lines on each of the first and second generally circularly spiraling portions 130, 140; and θ is the angle swept through by each portion 134, 140 and each section 152, 154. Although the preferred shape of the waveguide 120 is described by Equations 1–4, those skilled in the art will recognize that other similar, but different, shapes can be described by other equations.

An input light signal $\lambda_s$ can be injected at the first free end 132 for transmission through the waveguide 120. Preferably, the input light signal $\lambda_s$ is a broadband signal encompassing approximately 100 nanometers. A pump laser can be combined with a signal laser into a single mode optical fiber through a wavelength division multiplexer (not shown) and aligned with the first free end 132 so that pump light from the pump laser can be directed into the waveguide 120 with the input light signal $\lambda_s$. The input light signal $\lambda_s$, can then be amplified during transmission through the waveguide 120, and outputted from the second free end 142.

Figure 2:
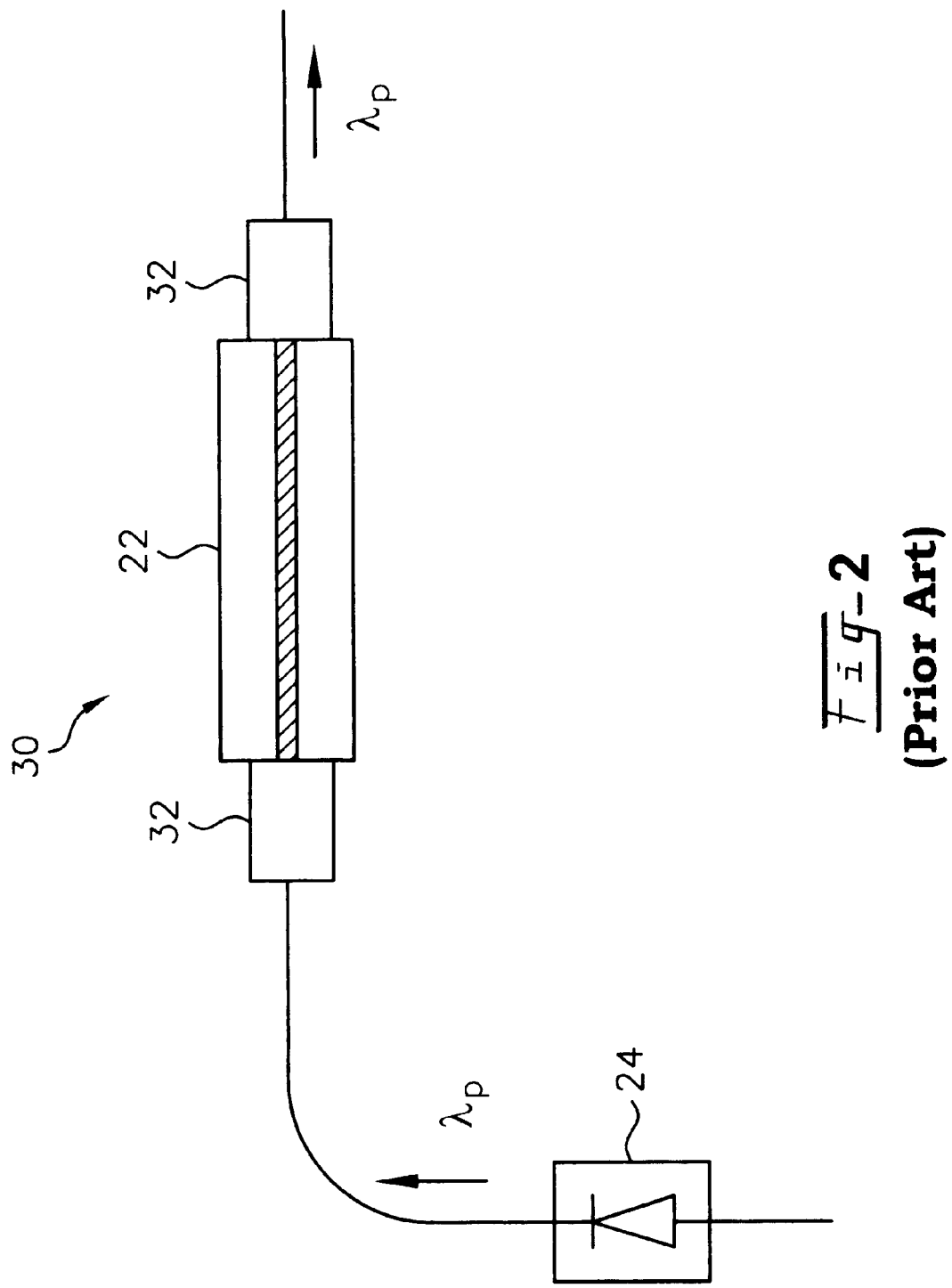
FIG. 2 is a schematic of a prior art laser.
Figure 3:
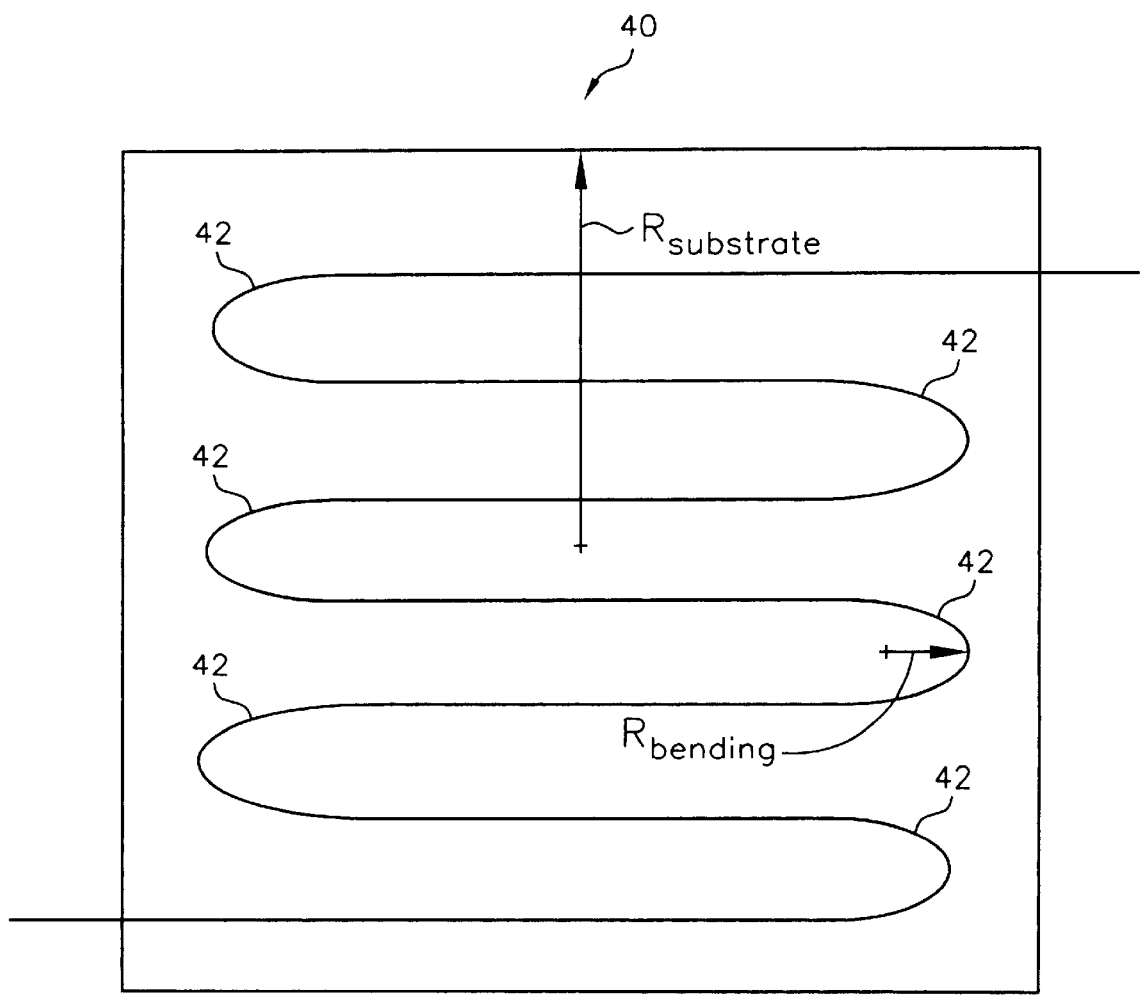
FIG. 3 is a top plan view of a first prior art waveguide.

The waveguide amplifier 100 can be used in an optical amplifier or a laser, such as the prior art amplifier 20 shown in FIG. I or the prior art laser 20 shown in FIG. 2, with the prior art waveguide 22 removed and the waveguide amplifier 100 installed therefor.

Figure 7:
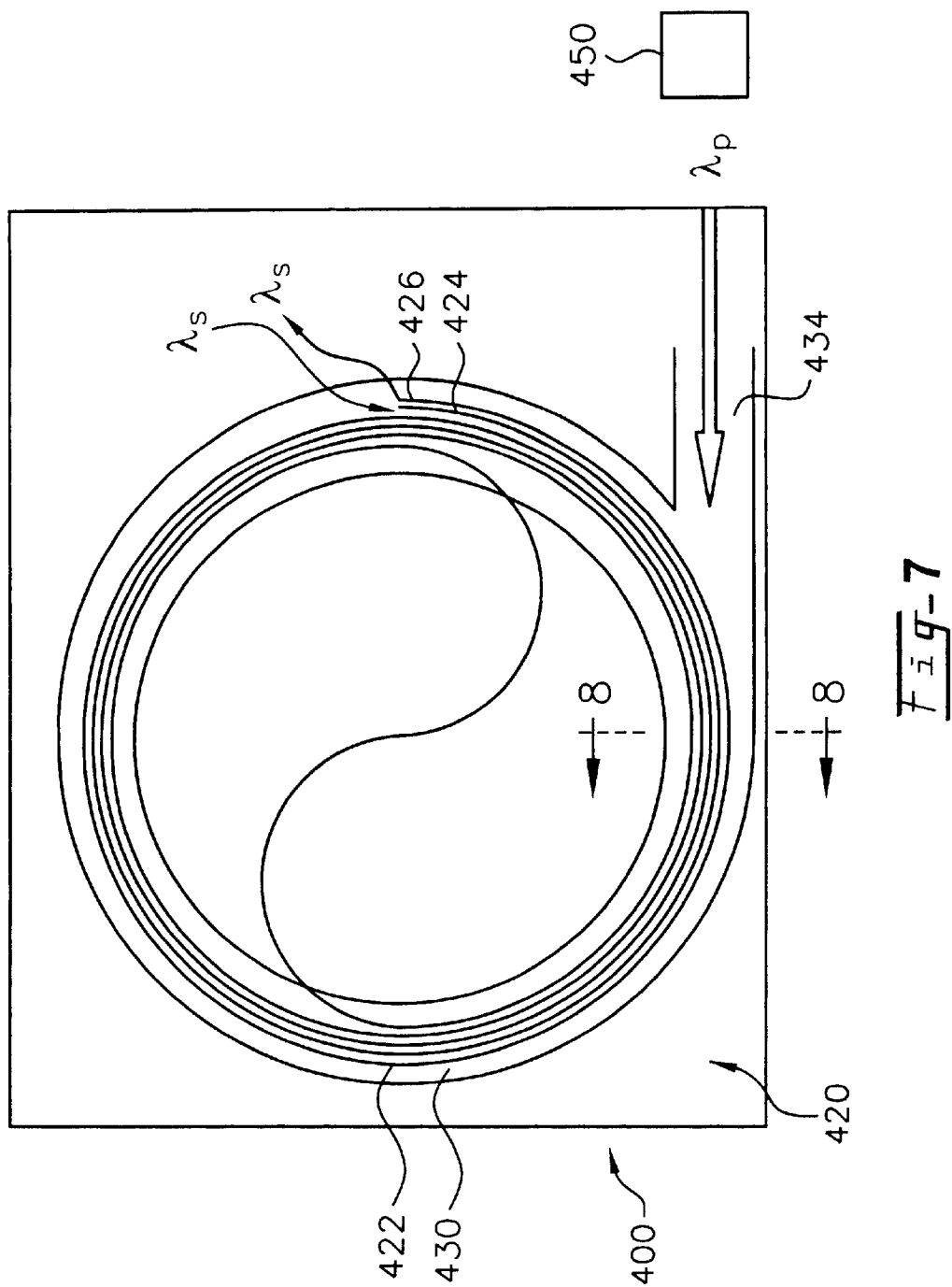
FIG. 7 is a top plan view of a pumping mechanism of a double cladded waveguide amplifier.
Figure 8:
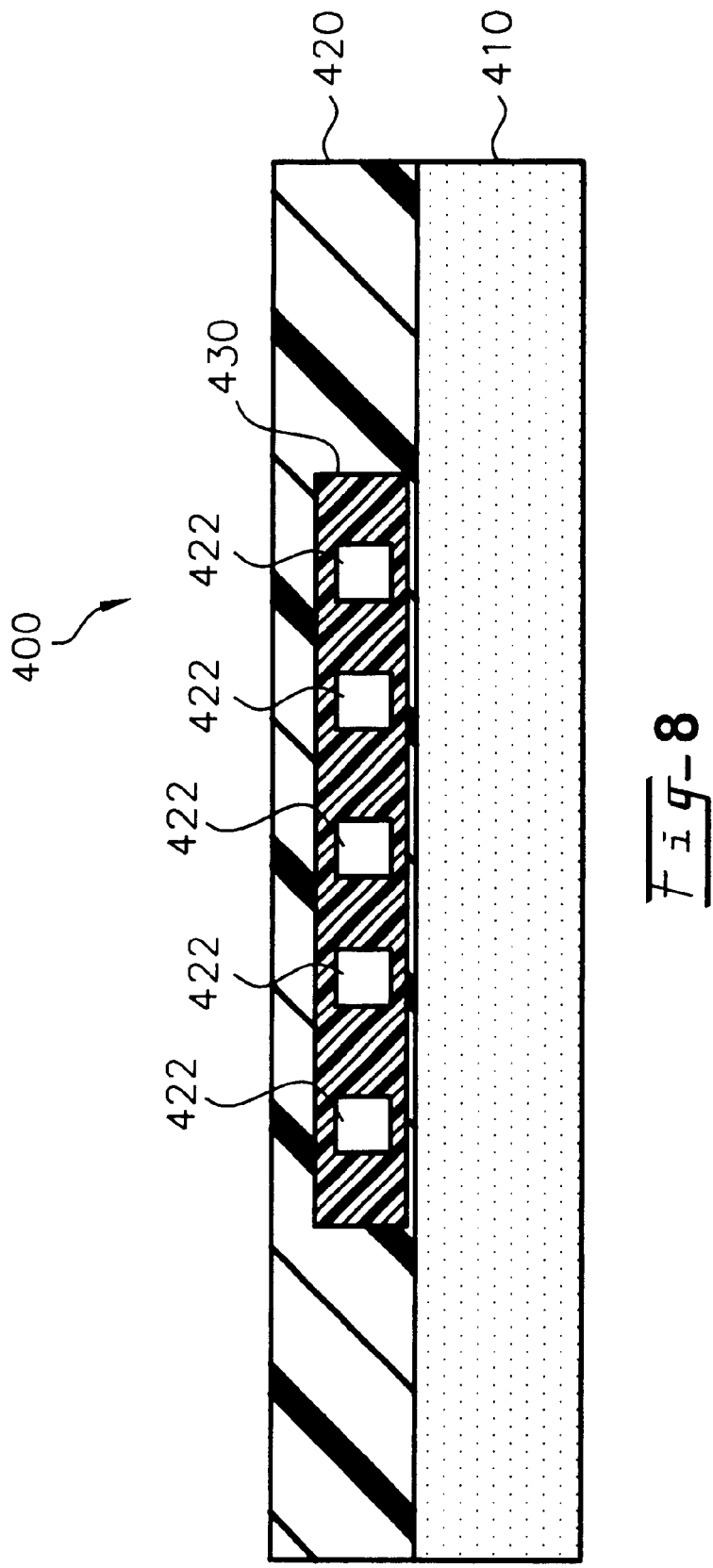
FIG. 8 is a partial side view, in section, of the waveguide of FIG. 7 taken along lines 8—8 of FIG. 7.

FIGS. 7 and 8 disclose a novel pumping mechanism of an RE doped channel waveguide amplifier 400 according to the principles of the present invention. The waveguide amplifier 400 is similar to the waveguide amplifier 100. However, as seen in FIG. 8, the waveguide amplifier 400 includes a first cladding layer 420 disposed on a substrate 410 and a second cladding layer 430 embedded in the first cladding layer 420. As shown in FIG. 7, a generally spiral-shaped rare earth doped optical waveguide 422, similar in shape to the waveguide 120, is embedded in the second cladding layer 430. The waveguide 422 has a first free end 424 at which a signal light $\lambda_s$ is inputted and a second free end 426 at which the signal light $\lambda_s$, having been amplified by pump light $\lambda_p$, is outputted.

The first waveguide cladding layer 420 has a refractive index lower than that of the second cladding layer 430, with the refractive index of the second cladding layer 430 being lower than the refractive index of the waveguide 422. As can be seen from FIG. 7, the second cladding layer 430 is generally annularly shaped and includes a lead-in portion 434 which extends generally tangentially from the annularly shaped portion of the second cladding layer 430. Although the second cladding layer 430 is preferably generally annularly shaped, those skilled in the art will recognize that the second cladding layer 430 need not necessarily be generally annularly shaped.

The first cladding layer 420 preferably has a width of about 20 micrometers to 500 micrometers, and a height of about 5 micrometers to 50 micrometers, in order to be large enough to surround the waveguide channel 422. The waveguide 422 is designed to support single mode propagation of both the signal light $\lambda_s$ at approximately 1300 nm or 1550 nm, depending on the rare earth dopant, and the pump light $\lambda_p$ at wavelengths such as 800 nm, 980 nm, 1060 nm, 1480 nm, or other known pump light wavelengths, while the second cladding layer 430 is designed to support multiplemodes of the pump light $\lambda_p$ from a multimode pump laser.

The pump laser 450 is disposed proximate the waveguide amplifier 400 such that pump light $\lambda_p$ from the pump laser 450 is directed generally tangentially into the second cladding layer 430 along the lead-in portion 434.

Multimode pump light $\lambda_p$ is injected into the second cladding layer 430 as is illustrated in FIG. 7. As the pump light $\lambda_p$ propagates within the second cladding layer 430, the pump modes overlap spatially with the waveguide 422 and the pump light $\lambda_p$ is absorbed by the rare earth ions in the waveguide 422. The pump light absorption in turn causes rare earth ion excitation and signal amplification, as is well known by those skilled in the art. The difference in the refractive indices between the first cladding layer 420 and the second cladding layer 430 keeps generally all of the pump light from exiting the second cladding layer 430, as will be understood by those skilled in the art.

The overall size of the waveguide amplifier 400 depends on the refractive index difference (Δn) between the channel waveguide 422 and the second cladding layer 430 surrounding the channel waveguide 422. The larger the Δn, the smaller the bending radius or diameter, and therefore the smaller the waveguide amplifier 400 can be. The size limit of the waveguide amplifier 400 is set by three factors: (1) waveguide bending loss dependence on bending curvature for given waveguide and cladding materials; (2) coupling losses on the input and output to singlemode fibers; and, to a lesser degree, (3) the change in the pump light $\lambda_p$ and the signal light $\lambda_s$ mode overlap with the RE doped waveguide 422 due to bending induced mode peak shift from the center of the waveguide 422.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A channel optical waveguide comprising:

a substrate;

a first cladding layer disposed on the substrate;

a second cladding layer disposed within the first cladding layer; and an optical waveguide channel disposed within the second cladding layer, the optical waveguide channel including:

a first generally circular spiraling portion having a first free end and a first connected end;

a second generally circular spiraling portion having a second free end and a second connected end; and a transition portion disposed generally outside the second cladding layer but within the first cladding layer, the transition portion having:

a first transition section connected to the first connected end;

a second transition section connected to the second connected end; and an inflection between the first and second transition portions.

2. The channel optical waveguide according to claim 1, wherein a cross-sectional area of the first cladding layer is between approximately 1 and 2 millimeters by approximately 5 and 50 micrometers.

3. The channel optical waveguide according to claim 1, wherein the second cladding layer has a refractive index higher than the first cladding layer.

4. The channel optical waveguide according to claim 1, wherein the optical waveguide channel is adapted to transmit broadband light.

5. The channel optical waveguide according to claim 4, wherein the broadband light encompasses approximately 100 nanometers.

6. The channel optical waveguide according to claim 1, wherein the first and second generally circular spiraling portions are generally intertwined with each other.

7. The channel optical waveguide according to claim 1, wherein the inflection is generally in a geometric center of the channel waveguide optical amplifier.

8. The channel optical waveguide according to claim 1, wherein the first generally circular spiraling portion has an approximate first radius and the second generally circular spiraling portion has an approximate second radius approximately equal to the approximate first radius.

9. The channel optical waveguide according to claim 8, wherein the first transition section has an approximate transition radius approximately one half of the approximate first radius.

10. The channel optical waveguide according to claim 1, wherein the optical waveguide channel comprises a rare earth element doped material.

11. The channel optical waveguide according to claim 10, wherein the material is optical glass.

12. The channel optical waveguide according to claim 10, wherein the material is an optical polymer.

13. The channel optical waveguide according to claim 10, wherein the rare earth element is from the group consisting of lanthanum, cerium, praseodymium, neodymium, promethium, samarium, europium, gadolinium, terbium, dysprosium, holmium, erbium, thulium, ytterbium, and lutetium.

14. The channel optical waveguide according to claim 10, wherein the rare earth element comprises a first rare earth element and a second element.

15. The channel optical waveguide according to claim 14, wherein the second element is from the group consisting of lanthanum, cerium, praseodymium, neodymium, promethium, samarium, europium, gadolinium, terbium, dysprosium, holmium, erbium, thulium, ytterbium, lutetium, and aluminum.

16. A channel waveguide optical amplifier assembly comprising:
 a waveguide optical amplifier including:
  a substrate;
  a first cladding layer disposed on the substrate;
  a second cladding layer disposed within the first cladding layer, the second cladding layer being generally annular and including a generally tangential portion; and
  an optical waveguide channel disposed within the second cladding layer, the optical waveguide channel including:
   a first generally circular spiraling portion having a first free end and a first connected end;
   a second generally circular spiraling portion having a second free end and a second connected end; and
   a transition portion having a first transition section connected to the first connected end, a second transition section connected to the second connected end, and an inflection between the first and second transition sections; and
 a pump laser disposed proximate the generally tangential portion and targeted to direct pump laser light to the second cladding layer through the generally tangential portion.

17. The channel waveguide optical amplifier assembly according to claim 16, wherein the pump laser is a 980 nanometer pump laser.

18. The channel waveguide optical amplifier assembly according to claim 16, wherein the pump laser is a 1480 nanometer pump laser.

19. The channel waveguide optical amplifier assembly according to claim 16, wherein the first and second generally circular spiraling portions are generally intertwined with each other.

20. The channel waveguide optical amplifier assembly according to claim 16, wherein the inflection is generally in a geometric center of the channel waveguide amplifier.

21. The channel waveguide optical amplifier assembly according to claim 16, wherein the first generally circular spiraling portion has an approximate first radius and the second generally circular spiraling portion has an approximate second radius approximately equal to the approximate first radius.

22. The channel waveguide optical amplifier assembly according to claim 21, wherein the first transition section has an approximate transition radius approximately one half of the approximate first radius.

23. The channel waveguide optical amplifier assembly according to claim 22, wherein the rare earth element comprises a first rare earth element and a second element.

24. The channel waveguide optical amplifier assembly according to claim 23, wherein the second element is from the group consisting of lanthanum, cerium, praseodymium, neodymium, promethium, samarium, europium, gadolinium, terbium, dysprosium, holmium, erbium, thulium, ytterbium, lutetium, and aluminum.

25. The channel waveguide optical amplifier assembly according to claim 16, wherein the optical waveguide channel comprises a rare earth element doped material.

26. The channel waveguide optical amplifier assembly according to claim 25, wherein the material is optical glass.

27. The channel waveguide optical amplifier assembly according to claim 25, wherein the material is an optical polymer.

28. The channel waveguide optical amplifier assembly according to claim 25, wherein the rare earth element is from the group consisting of lanthanum, cerium, praseodymium, neodymium, promethium, samarium, europium, gadolinium, terbium, dysprosium, holmium, erbium, thulium, ytterbium, and lutetium.

29. A method of amplifying light in an optical waveguide comprising:
 providing a channel optical waveguide including:
  a substrate;
  a first cladding layer disposed on the substrate;
  a second cladding layer disposed within the first cladding layer, the second cladding layer including a generally tangential portion;
  a rare earth element containing optical waveguide channel disposed within the second cladding layer, the optical waveguide channel including:
   a first generally circular spiraling portion having a first free end and a first connected end;

a second generally circular spiraling portion having a second free end and a second connected end; and a transition portion having:
- a first transition section connected to the first connected end;
- a second transition section connected to the second connected end; and
- an inflection between the first and second transition sections;

providing a pump laser disposed proximate the generally tangential portion and targeted to direct pump laser light to the second cladding layer through the generally tangential portion;

transmitting signal light into the first free end of the first generally spiraling portion of the optical waveguide channel; and transmitting pump light into the second cladding layer through the generally tangential portion, the pump light exciting the rare earth element and amplifying the signal light.

30. The method according to claim 29, wherein transmitting signal light comprises transmitting broadband signal light.

31. The method according to claim 30, wherein transmitting broadband signal light comprises transmitting light having a bandwidth of approximately 100 nanometers.

* * * * *